(12) United States Patent
Hall et al.

(10) Patent No.: US 7,448,646 B2
(45) Date of Patent: Nov. 11, 2008

(54) AIRBAG SYSTEM FOR OUT-OF-POSITION OCCUPANT PROTECTION AND ADAPTIVE VENTING

(75) Inventors: Ian Hall, Ann Arbor, MI (US); Manoharprasad K. Rao, Novi, MI (US); Sean Ryan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 483 days.

(21) Appl. No.: 11/163,960

(22) Filed: Nov. 4, 2005

(65) Prior Publication Data

US 2007/0102911 A1 May 10, 2007

(51) Int. Cl.
B60R 21/16 (2006.01)
B60R 21/26 (2006.01)

(52) U.S. Cl. .................. 280/739; 280/740; 280/742; 280/743.2

(58) Field of Classification Search .......... 280/739, 280/740, 742, 743.2
See application file for complete search history.

(56) References Cited

U.S. PATENT DOCUMENTS

| | | | |
|---|---|---|---|
| 6,409,213 B2 | 6/2002 | Webber et al. | |
| 6,454,300 B1 * | 9/2002 | Dunkle et al. | 280/743.2 |
| 6,513,835 B2 * | 2/2003 | Thomas | 280/743.2 |
| 6,540,257 B2 | 4/2003 | Magoteaux | |
| 6,592,146 B2 * | 7/2003 | Pinsenschaum et al. | 280/743.2 |
| 6,616,184 B2 * | 9/2003 | Fischer | 280/743.2 |
| 6,746,044 B2 | 6/2004 | Elqadah et al. | |
| 6,773,030 B2 | 8/2004 | Fischer | |
| 6,932,384 B2 | 8/2005 | Waid et al. | |
| 6,932,385 B2 * | 8/2005 | Hawthorn et al. | 280/743.2 |
| 7,083,192 B2 * | 8/2006 | Fischer et al. | 280/739 |
| 7,249,783 B2 * | 7/2007 | Parkinson et al. | 280/743.2 |
| 7,261,320 B2 * | 8/2007 | Fredin et al. | 280/743.2 |
| 7,275,761 B2 * | 10/2007 | Gould et al. | 280/743.2 |
| 7,364,192 B2 * | 4/2008 | Braun et al. | 280/742 |
| 7,377,546 B2 * | 5/2008 | Fischer et al. | 280/739 |
| 2002/0117840 A1 | 8/2002 | Dunkle et al. | |
| 2002/0145274 A1 | 10/2002 | Magoteaux | |
| 2004/0051285 A1 | 3/2004 | Fischer | |
| 2004/0051286 A1 | 3/2004 | Fischer et al. | |
| 2004/0232677 A1 | 11/2004 | Fischer et al. | |
| 2005/0098990 A1 | 5/2005 | Pinsenschaum et al. | |
| 2005/0127648 A1 | 6/2005 | Fischer et al. | |
| 2005/0146122 A1 | 7/2005 | Gould et al. | |
| 2005/0248137 A1 * | 11/2005 | Delventhal et al. | 280/739 |
| 2006/0290117 A1 * | 12/2006 | Fischer et al. | 280/739 |

* cited by examiner

*Primary Examiner*—Paul N. Dickson
*Assistant Examiner*—Joselynn Y. Sliteris
(74) *Attorney, Agent, or Firm*—Frank A. MacKenzie; Brooks Kushman P.C.

(57) ABSTRACT

The present invention provides a vehicle airbag assembly and method for deployment. An inflator is connected to an airbag wherein the inflator generates gases that cause inflation of the airbag. A housing substantially encloses the airbag and the inflator. The housing includes a vent hole for venting gases. An airbag tether is included having at least a first and a second end, wherein the first end is attached to the airbag and the second end is attached to a venting member. The venting member, being configured to cover the vent hole, is moveable with respect to the housing. During a first airbag deployment stage, the venting member is forced away from the vent hole as the inflator generates gases. An actuator releases the second end of the airbag tether from the venting member during a second airbag deployment stage for the passage of gases through the vent hole.

13 Claims, 5 Drawing Sheets

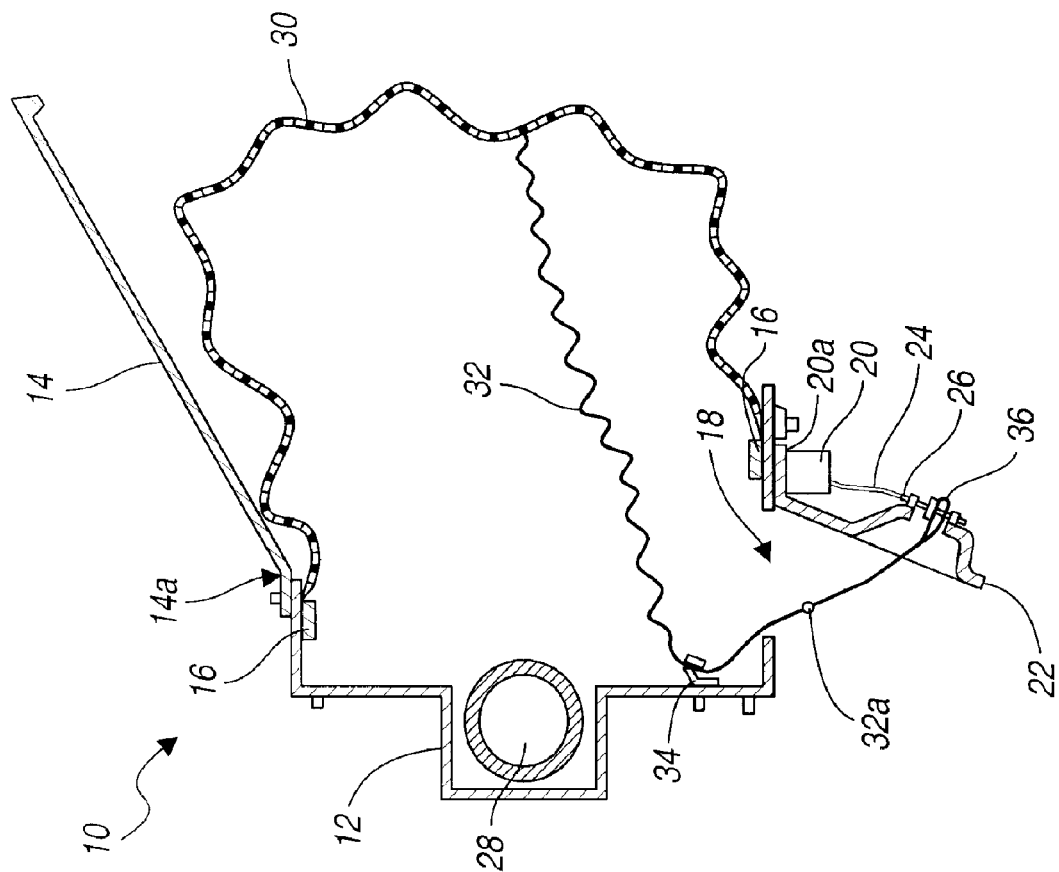
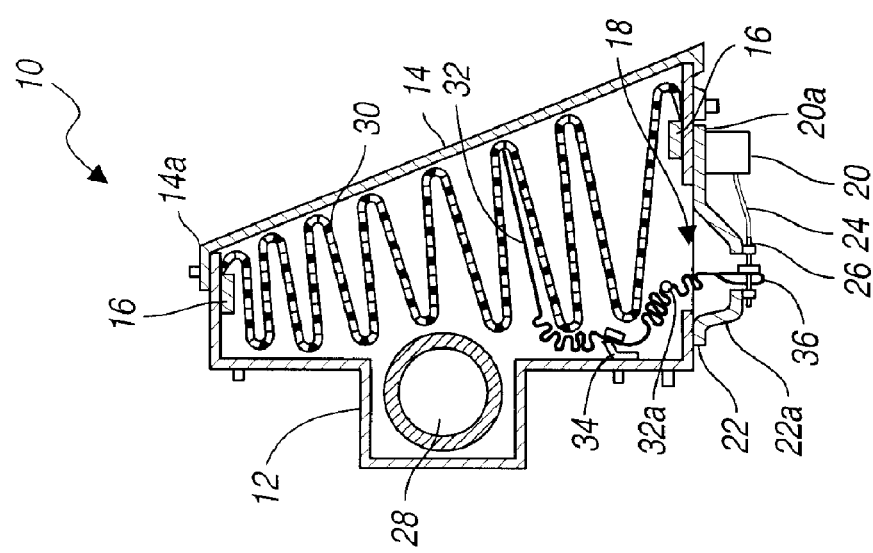

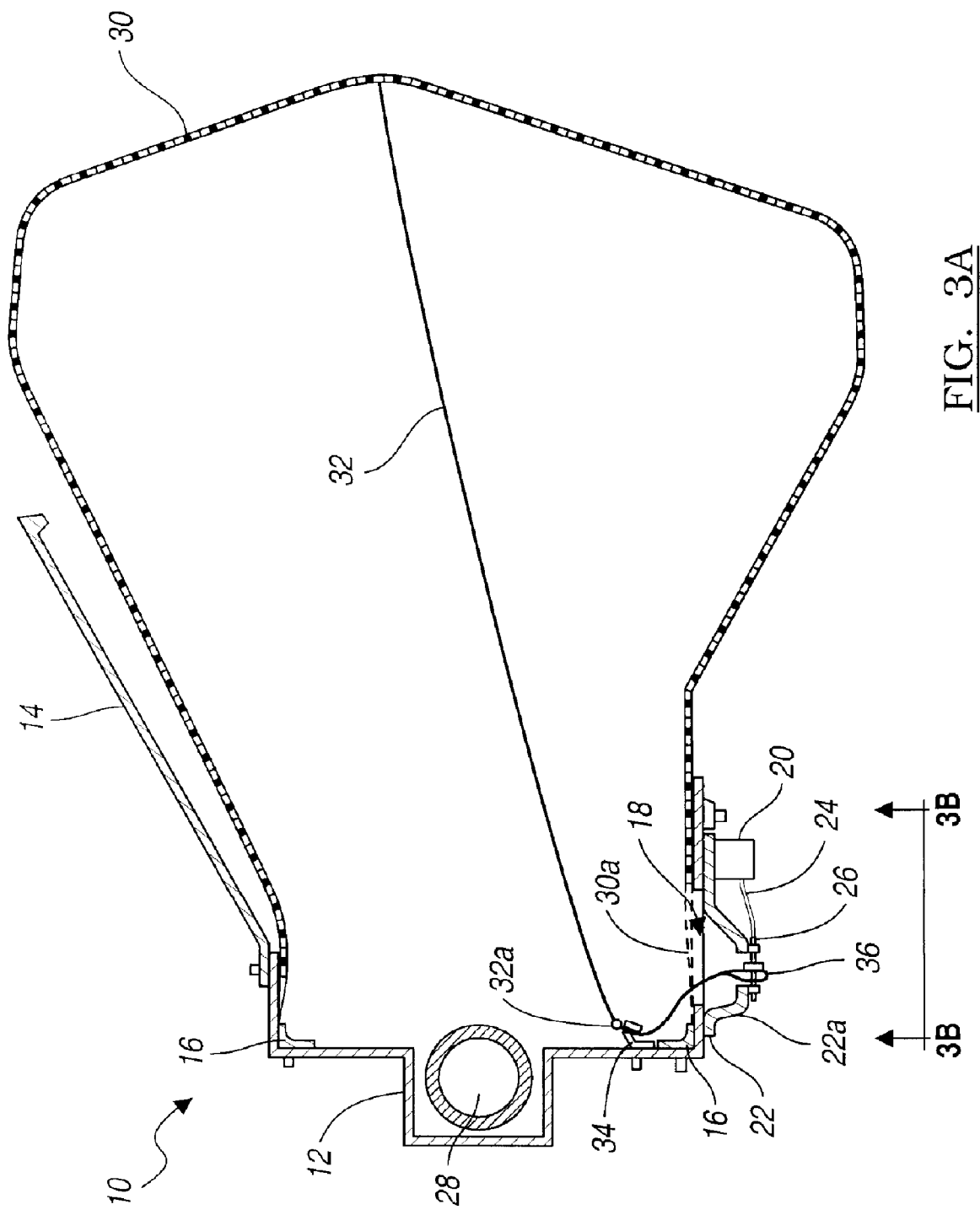

AIRBAG SYSTEM FOR OUT-OF-POSITION OCCUPANT PROTECTION AND ADAPTIVE VENTING

TECHNICAL FIELD

The present invention relates to a system and method for controlling the deployment of an airbag within a vehicle.

BACKGROUND

Conventional airbag systems include an inflator that is connected to an inflatable airbag. These systems may also include a vent for venting gases that are generated by the inflator. Through the use of the vent, these airbag systems may be designed to allow out-of-position ("OOP") venting (also referred to as passive venting). OOP venting occurs during the early stages of a vehicular event, upon deployment of the airbag, to mitigate potential injury to an occupant that is out of position with respect to a deployment location of the airbag.

When the airbag system is in a pre-deployed condition (i.e., the airbag has not been deployed), the vent is normally closed. Upon deployment of the airbag, the vent may be opened by internal pressures of the airbag resulting from the generation of gases by the inflator. Venting inflation gases during the initial stages of airbag deployment reduces airbag forces on the occupants that are out of position with respect to a deploying airbag. In some systems, tethers are attached to vent closing mechanisms at one end and attached to the airbag's primary or frontal surface at the other end. As such, the tether may be used to close the vents as the airbag inflates. If there is an out of position occupant, the deployment of the primary surface of the airbag (i.e., a surface that contacts the occupant) is inhibited as the airbag contacts the occupant, which prevents the tether mechanism from closing the open vent. As such, the open vent continues to vent inflation gases for a longer period of time. Accordingly, the force of the impact experienced by the occupant is reduced as gases within the airbag are vented.

In other conventional airbag systems, venting for dynamic events may be accomplished by adaptive venting technologies. Adaptive venting utilizes devices that are configured to control the venting area at certain times during a vehicular event. Although some conventional airbag systems are capable of passive venting while others are capable of adaptive venting, there exists a wide horizon for improvement. Particularly, these conventional systems are incapable of both passive venting and adaptive venting during dynamic vehicular events.

The present invention was conceived in view of these and other disadvantages of conventional airbag systems.

SUMMARY

The present invention provides a vehicle airbag assembly and method for deployment. The airbag assembly includes an airbag that is deployable and inflatable for providing a cushioning surface upon deployment. An inflator is connected to the airbag wherein the inflator generates gases that cause inflation of the airbag. A housing substantially encloses the airbag and the inflator. The housing also includes a vent hole for venting gases generated by the inflator. The airbag assembly includes an airbag tether having at least a first and a second end, wherein the first end is attached to the airbag. A venting member is moveable with respect to the housing and is configured to cover and uncover the vent hole, wherein the venting member has the second end of the airbag tether connected thereto.

The airbag assembly also includes an actuator that is coupled to the venting member. Additionally, the venting member moves away from the vent hole upon pressurization of the airbag housing during an early stage of a vehicular event, thereby uncovering the vent hole for the passage of gases through the vent hole. Under normal airbag deployment conditions, the primary surface of the airbag is not inhibited by an out of position occupant, and the airbag cushion is able to substantially inflate. As the airbag cushion substantially inflates, the airbag tether is tensioned, which causes the vent member to close the vent hole preventing the passage of gases through the vent hole. Furthermore, the actuator, being coupled to the venting member is configured to cause the release of the second end of the airbag tether from the venting member under controlled conditions during a later stage of the deployment event. As such, upon release of the second end, the vent member may again uncover the vent hole due to the airbag internal pressures and the additional force provided by the actuator.

The method of deploying the airbag through the use of the airbag assembly includes providing a venting member and an actuator, wherein the venting member is connected to the actuator. As such, the venting member may be attached to the housing and is moveable about the housing to cover and uncover the vent hole in response to activation of the actuator. The method includes inflating the airbag while supplying gases to the airbag through the use of the inflator. During early stages of a vehicular event, the inflator gasses pressurize the airbag housing, which causes the venting member to uncover the vent hole. The method also includes covering the vent hole, at an intermediate time during the vehicular event, as the airbag cushion expands and tensions the airbag tether. In one embodiment, the first end of the airbag tether is coupled to the airbag and the second end is connected to the venting member via a tether release pin. The method further includes releasing the tether release pin from the venting member through the use of the actuator, thereby causing the release of the second end of the tether from the venting member during the vehicular event. After the release of the airbag tether, the venting member may open due to the internal pressure of the airbag. As the venting member opens, inflation gases are vented away from the airbag in a controlled manner to further optimize the airbag pressure for the occupant's protection.

BRIEF DESCRIPTION OF THE DRAWINGS

The features of the present invention are set forth with particularity in the appended claims. The embodiments described herein, both as to its organization and manner of operation, together with further objects and advantages thereof, may be best understood with reference to the following description, taken in connection with the accompanying drawings in which;

FIG. 1B illustrates an alternative embodiment of an airbag assembly in the pre-deployed condition in accordance with an embodiment of the present invention;

FIG. 2B illustrates the airbag assembly of FIG. 1B during an early stage of an airbag deployment in accordance with an embodiment of the present invention;

FIG. 3A illustrates the airbag assembly of FIG. 1 in a later stage of an airbag deployment in accordance with an embodiment of the present invention;

DETAILED DESCRIPTION OF THE PREFERRED EMBODIMENTS

By way of example, a system and method for implementing the present invention is described below. The system and method may be adapted, modified or rearranged to best fit a particular implementation without departing from the scope of the present invention.

Figure 1A:
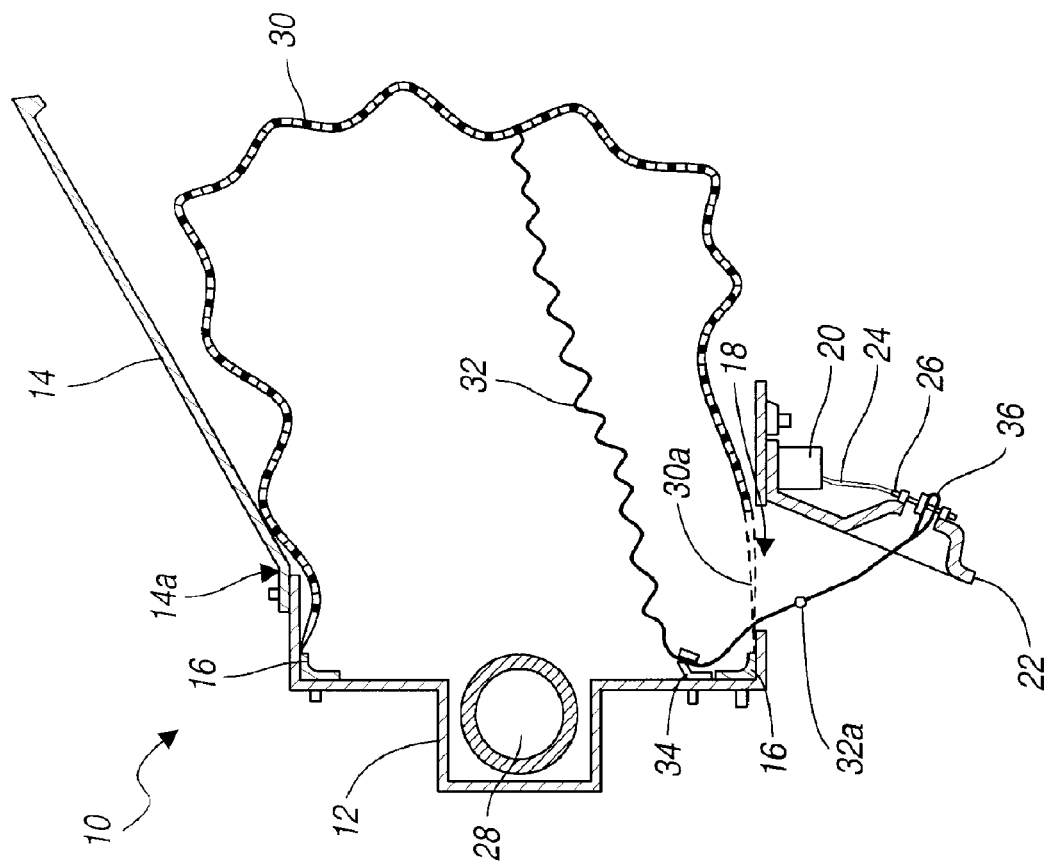
FIG. 1A illustrates an airbag assembly in a pre-deployed condition in accordance with an embodiment of the present invention.

Referring to FIG. 1A, an airbag assembly 10 is shown that is capable of passive and active venting during a vehicular condition. As such, airbag assembly 10 is capable of out-of-position (OOP) venting (or passive venting) and adaptive venting during a dynamic vehicular event. Airbag assembly 10 may be integrated with an instrument panel (not shown) on the passenger side and/or the driver side of a vehicle.

A housing 12 may be mounted within the vehicle and is operatively connected to an airbag door 14. Door 14 includes a door hinge 14a that enables airbag door 14 to swing away from housing 12 during certain vehicular events.

Housing 12 includes a housing vent 18, which is an opening or vent hole that enables the flow of gases out of airbag assembly 10. An actuator 20 is mounted to housing 12 through the use of an actuator base 20a. Actuator 20 may include, for example, a pyrotechnic actuator. Additionally, a venting member 22 is integrated with base 20a and is configured to cover and uncover housing vent 18. As such, venting member 22 is moveable with respect to housing 12. As illustrated, actuator 20 may be connected to venting member 22 at a raised section 22a. In one embodiment, raised section 22a includes several tabs having apertures for receiving and holding a tether release pin 26. Particularly as shown, tether release pin 26 may be coupled to an actuator cable 24, wherein the tether release pin is operatively secured within tabs integrated with raised section 22a. As will be described hereinafter, in certain vehicular events, actuator 20 is configured to retract tether release pin 26 from venting member 22 in a manner that allows the release of an airbag tether 32 and movement of venting member 22.

Enclosed within housing 12 is an inflator 28 and an airbag 30. As recognized by one of ordinary skill in the art, inflator 28 is connected to airbag 30 and is adapted to generate gases that cause inflation of airbag 30. As shown in FIG. 1, airbag assembly 10 is in a pre-deployed condition and airbag 30 is folded in a known manner within housing 12.

An airbag tether 32 is connected at one end to airbag 30. At a second end of airbag tether 32, a tether end 36 is looped around tether release pin 26. As such, upon deployment of airbag 30, airbag tether 32 is tensioned thereby causing tether end 36 to pull on tether release pin 26, thereby covering housing vent 18. It is recognized that in some embodiments airbag tether 32 may have a configuration different than the configuration shown in FIG. 1. For instance, airbag tether 32 may have a first end connected to airbag 30 (as shown in FIG. 1) and a second end that splits into multiple tether ends, thereby forming a "Y" shaped configuration.

In either embodiment of airbag tether 32, airbag 30 may include a vent hole 30a that is substantially aligned with housing vent 18. As such, gases generated by inflator 28 may pass through vent hole 30a and housing vent 18, thereby exiting airbag assembly 10. A retainer ring 16 may be mounted within airbag assembly 10 and provide a surface which retains airbag 30 in a desired position.

Airbag tether 32 includes a tether stop 32a that is engageable with a tether lock 34. In one aspect, tether lock 34 may be mounted or attached to housing 12 in a known manner that enables movement of vent tether 32 in one direction while inhibiting movement in another direction. In one embodiment tether stop 32a may be a folded and sewn piece of material that is attached to vent tether 32. In the embodiment shown, the slack in the airbag tether 32 allows the venting member 22 to open during an early stage of the vehicular event. As the airbag 30 expands, it pulls airbag tether 32 and tether stop 32a through tether lock 34, which causes venting member 22 to close housing vent 18. Consequently, vent member 22 is prevented from opening again because tether stop 32a has engaged tether lock 34, which inhibits the movement of the airbag tether 32 in the direction of housing vent 18.

Referring to FIG. 1B, an alternative embodiment of retaining airbag 30 to the housing 12 is illustrated. Accordingly, retainer ring16 is mounted to housing 12 in a manner that may eliminate the need for vent hole 30a (FIG. 1A). As compared to FIG. 1A, FIG. 1B illustrates the lower portion of retainer 16 being mounted to housing 12 within a closer proximity to airbag door 14. Additionally, airbag 30 does not traverse vent hole 30a, as retainer ring 16 is mounted in front of (i.e., adjacent to actuator base 20a) housing vent 18. The embodiment shown in FIG. 1B facilitates the removal of airbag material and the reduction in the complexity of airbag 30 due to the lack of an airbag vent hole.

Figure 2A:
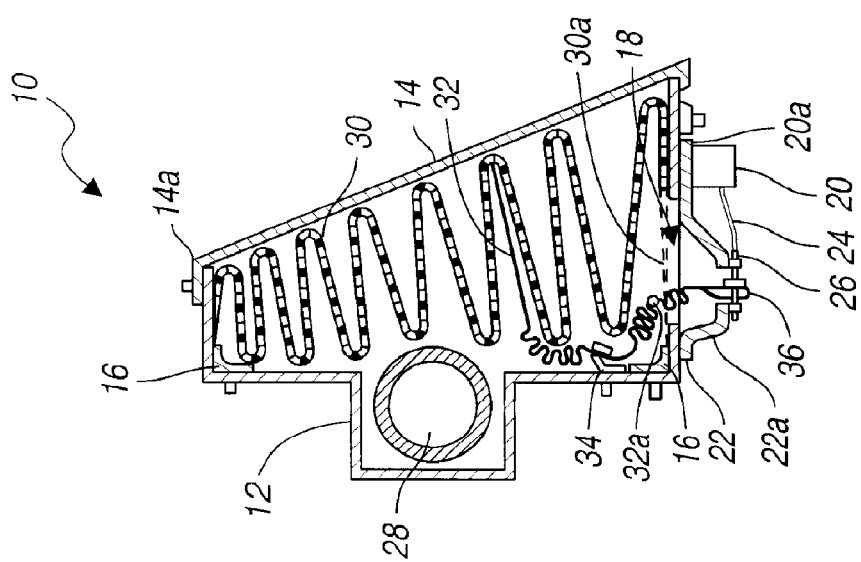
FIG. 2A illustrates the airbag assembly of FIG. 1A during an early stage of an airbag deployment in accordance with an embodiment of the present invention.

Referring to FIG. 2A, airbag assembly 10 of FIG. 1A is shown in an early stage of an airbag deployment event. At this stage, the inflator 28 has begun to generate gases that cause pressurizing of airbag housing 12. This pressurization causes the vent member 22 to open relative to the housing vent 18. Should an occupant be out of position relative to the airbag 30, the airbag 30 will contact the occupant early in the event and the occupant will inhibit the expansion of the airbag 30. When the airbag 30 is inhibited from expanding to a significant distance and/or volume, the airbag tether 32 will not be tensioned. This, in turn, will allow the venting member 22 to continue to vent inflation gases through vent hole 30a and housing vent 18, thus reducing the pressure of the airbag 30. Referring to FIG. 2B, airbag assembly 10 of FIG. 1B, is also shown during an early stage of a deployment event.

When the occupant is not out-of-position, airbag 30 may enter a significantly full deployed condition as illustrated by FIG. 3A. As shown, airbag tether 32 is tensioned in the direction in which airbag 30 is deployed. As a result, tether end 36, being looped around tether release pin 26, pulls venting member 22 toward housing vent 18, thereby covering housing vent 18. Covering of housing vent 18 by venting member 22 limits the flow of gases out of housing 12.

Figure 3B:
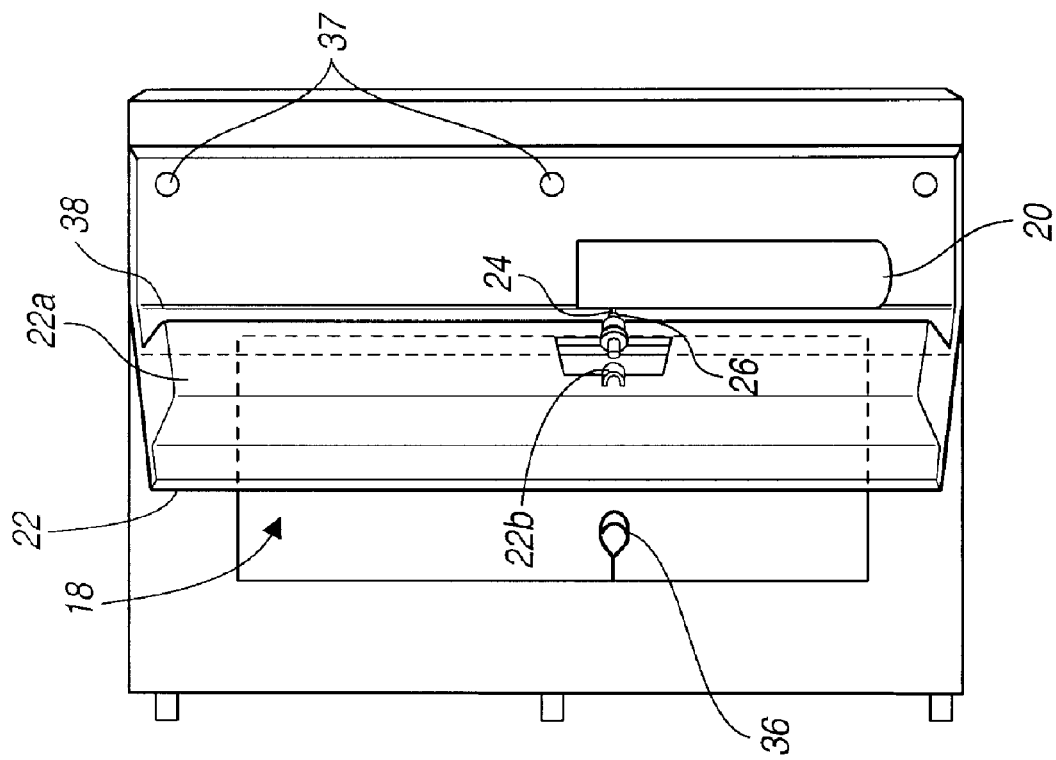
FIG. 3B illustrates an enlarged perspective view of the vent door of FIG. 3A along line 3B-3B in accordance with an embodiment of the present invention.

Now, referring to FIG. 3B, an enlarged view of venting member 22, which is connected to actuator 20 is shown along lines 3B-3B of FIG. 3A. As illustrated, actuator 20 is connected to tether release pin 26 through the use of actuator cable 24. Additionally, tether release pin 26 has airbag tether 32 looped thereabout so as to cause venting member 22 to move toward and cover housing vent 18 when the tether is tensioned by the deploying airbag (FIG. 3A). A raised section 22a is shown. Raised section 22a provides improved mechanical advantage for actuator 20 to release tether release pin 26. Additionally, venting member 22 includes a vent hinge 38 that enables venting member 22 to swing away and toward housing vent 18. Venting member 22 also includes multiple fasteners 37 that enable venting member 22 to be secured to housing 12. In alternative embodiments, fasteners 37 may be embodied as a weld, rivet, or other attachment means without departing from the scope of the present invention.

Now referring to FIG. 4A, airbag assembly 10 is shown in a later airbag deployment stage. In one aspect, the airbag deployment stage of FIG. 4A illustrates an adaptive venting deployment stage. The adaptive venting enables additional venting of housing 12 and airbag 30 in a controlled manner. As recognized by one of ordinary skill, following full deployment of airbag 30, to facilitate the removal of gases from airbag 30, airbag 30 should be allowed to deflate. Accordingly, a controlled deflation of airbag 30 is desirable. In the embodiment described herein, airbag 30 is capable of controlled deflation by the adaptive venting procedure, wherein actuator 20 enables the release of tether end 36 in a controlled manner.

After airbag 30 is fully inflated, based on the vehicular condition and occupant information, actuator 20 is configured to retract actuator cable 24, thereby causing tether release pin 26 to slide out of the apertures located within tabs 22b. Once tether release pin 26 is removed from tab 22b, tether end 36 is released from tether release pin 26 and venting member 22 moves or falls away from housing vent 18. Accordingly, gases within airbag 30 may pass through housing vent 18 thereby deflating airbag 30 in a desired manner.

Figure 4B:
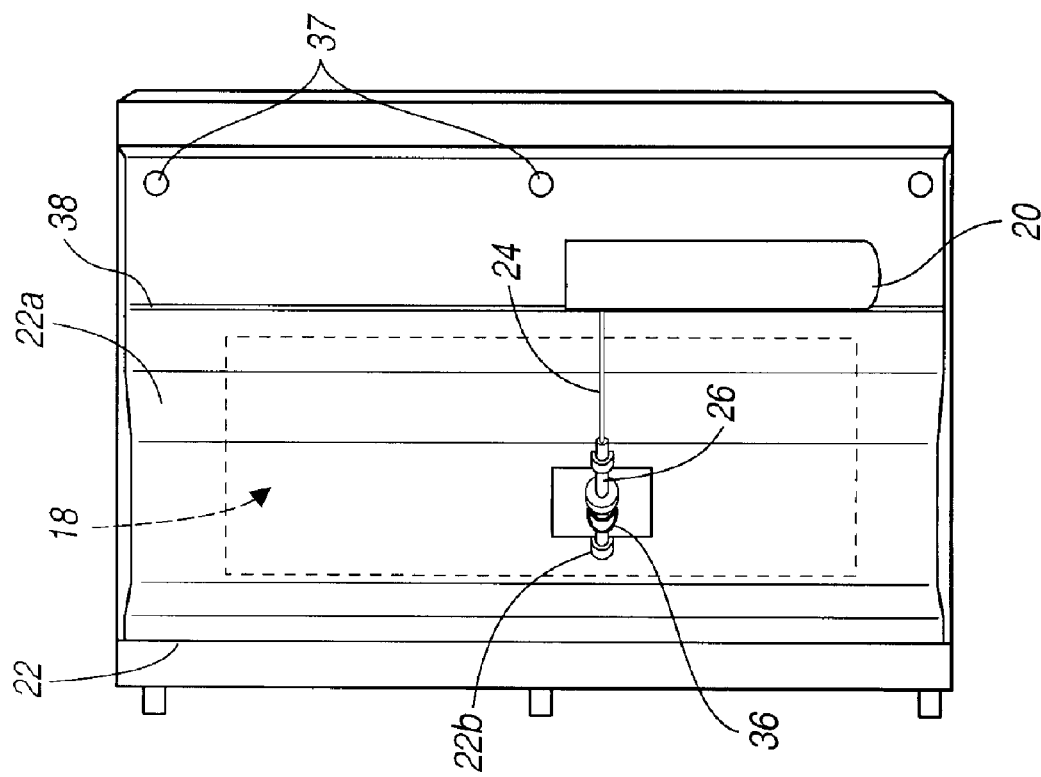
FIG. 4B illustrates an enlarged perspective view of the vent door of FIG. 4A along line 4B-4B in accordance with an embodiment of the present invention.
Figure 4A:
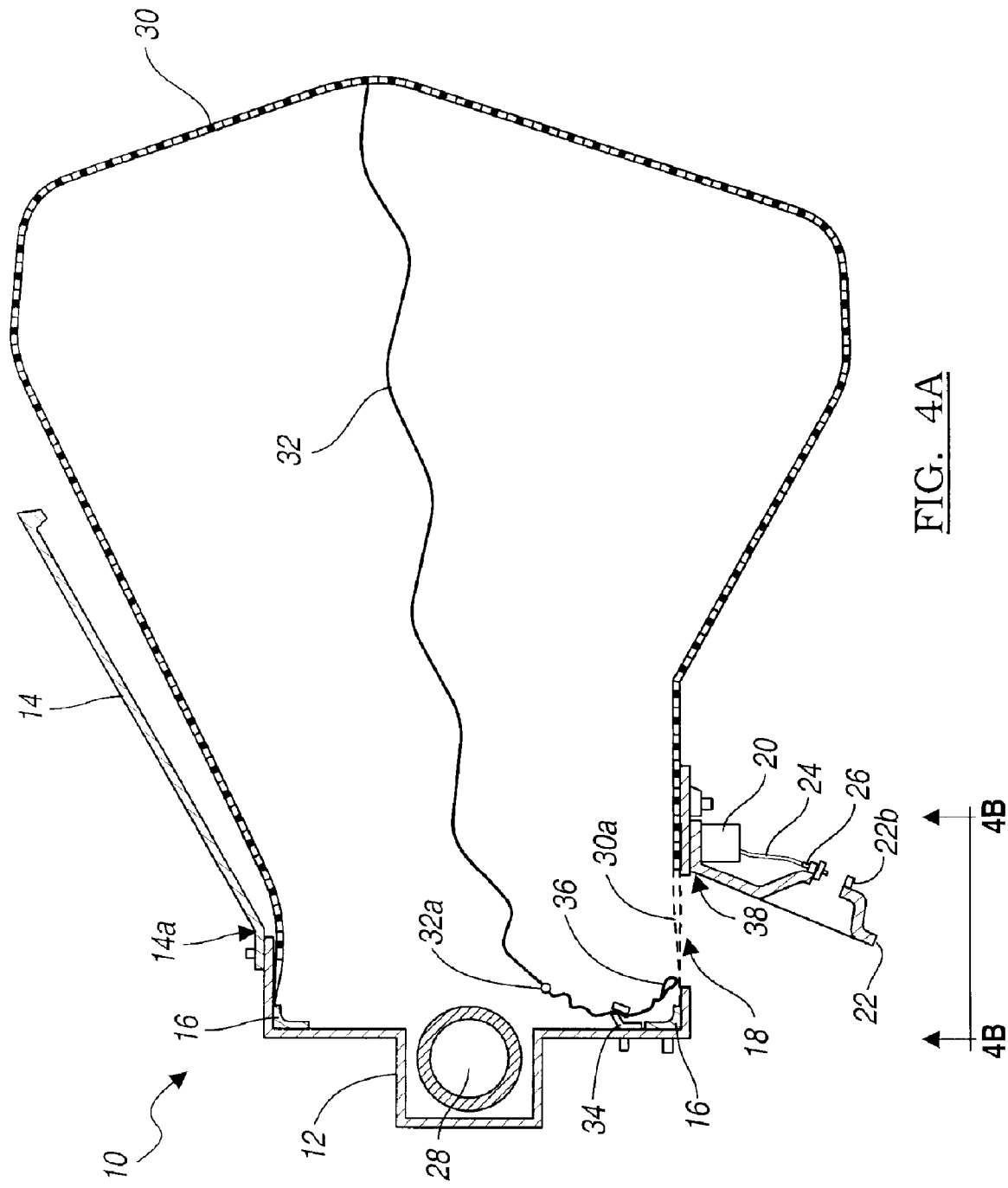
FIG. 4A illustrates the airbag assembly of FIG. 1 during an adaptive venting stage in accordance with an embodiment of the present invention.

Now referring to FIG. 4B, an enlarged perspective view of venting member 22 is shown along line 4B-4B of FIG. 4A. In the illustrated embodiment, tether release pin 26 has been released (i.e., retracted). Consequently, airbag tether end 36 is disengaged from tether release pin 26. At this point within the adaptive venting stage, airbag tether 32 has been pulled inside housing 12, as airbag 30 (FIG. 4A) is substantially deployed. Additionally, due to the internal pressure of the airbag, vent member 22 may move away from the vent hole 18 and permit the release of airbag gases through vent hole 18 for controlled deflation of the airbag.

It is recognized, that the embodiments described herein are, by way of example and not of limitation. Accordingly, additional methods of adaptive venting may include detaching fasteners 37 (FIGS. 3B and 4B) of venting member 22 and using the vent tether as an attachment or secondary hinge point for the venting member 22. Additional adaptive venting methods may include breaking or slicing the tether in a known manner. Furthermore, other embodiments may include using any number of known devices, like a micro-gas generator, that may cause the separation of tether 32 from venting member 22.

While the best mode for carrying out the invention has been described in detail, those familiar with the art to which this invention relates will recognize various alternative designs and embodiments for practicing the invention as defined by the following claims.

What is claimed is:

1. An airbag assembly for a vehicle, comprising:
    an airbag that is deployable and inflatable for providing a cushioning surface upon deployment;
    an inflator being connected to the airbag, the inflator for generating gases that cause inflation of the airbag;
    a housing substantially enclosing the airbag and the inflator, the housing having a vent hole for venting gases generated by the inflator;
    an airbag tether having at least a first and a second end, wherein the first end is attached to the airbag;
    a venting member being moveable with respect to the housing and being configured to cover and uncover the vent hole, the venting member having the second end of the airbag tether connected thereto; and
    an actuator coupled to the venting member, the venting member moving away from the vent hole upon inflation of the airbag during a first stage of an airbag deployment event, thereby uncovering the vent hole for the passage of gases through the vent hole, the actuator being configured to cause release of the second end of the airbag tether from the venting member during an adaptive venting stage, wherein the airbag is in a substantially full deployment condition.

2. The assembly of claim 1, wherein the actuator is coupled to the venting member through the use of an actuator cable.

3. The assembly of claim 2, wherein the venting member includes a raised section and the actuator cable is connected to a tether release pin, the raised section having the tether release pin operatively secured thereto, the tether release pin enabling coupling of the actuator to the venting member.

4. The assembly of claim 3, wherein the actuator causes release of the second end of the airbag tether from the venting member by retracting the tether release pin from the venting member.

5. The assembly of claim 1, further comprising a tether lock attached to and enclosed within the housing, the tether lock permitting the movement of the tether in one direction.

6. The assembly of claim 5, wherein the tether includes a tether stopping member that is operable with the tether lock for inhibiting movement of the tether in a predetermined direction.

7. The assembly of claim 1, further including an airbag assembly door that is operatively connected to the housing, the airbag assembly door providing an exit location for the airbag during the airbag deployment event.

8. A method of deploying an airbag through the use of an airbag assembly, wherein the airbag assembly includes an inflator coupled to an airbag, the inflator and airbag being substantially enclosed by an airbag assembly housing having a vent hole, the method comprising:
    providing a venting member and an actuator, wherein the venting member is connected to the actuator, the venting member being attached to the housing and moveable about the housing to cover and uncover the vent hole;
    inflating the airbag by supplying gases to the airbag through the use of the inflator thereby causing the venting member to uncover the vent hole by moving away from the vent hole during a first stage of an airbag deployment event for the passage of gases through the vent hole;
    covering the vent hole by causing tensioning of an airbag tether having at least a first end and a second end, wherein the first end is coupled to the air bag and the second end is connected to the venting member; and
    releasing a tether release pin from the venting member through the use of the actuator thereby causing the release of the second end of the airbag tether from the venting member during a second airbag deployment stage.

9. The method of claim 8 wherein, releasing the tether release pin includes retracting the tether release pin from the venting member through the use of the actuator.

10. The method of claim 8, wherein, the venting member includes a raised or lowered section for securing the tether release pin.

11. The method of claim 8, wherein tensioning the airbag tether having at least the first end and the second end includes an airbag tether that operatively contacts a tether lock attached to and enclosed by the housing, wherein the tether lock inhibits movement of the tether in a predetermined direction.

12. The method of claim 11, wherein the tether includes a tether stopping member that is operable with the tether lock for inhibiting movement of the tether in the predetermined direction.

13. The method of claim 8, wherein providing the actuator includes providing a pyrotechnic actuator.

* * * * *